United States Patent [19]

McTaggart

[11] Patent Number: 5,653,329

[45] Date of Patent: Aug. 5, 1997

[54] ACCUMULATING LIFT AND CARRY CONVEYER SYSTEM

[75] Inventor: Michael Douglas McTaggart, Windsor, Canada

[73] Assignee: Valiant Machine & Tool Inc., Ontario, Canada

[21] Appl. No.: 508,671

[22] Filed: Jul. 28, 1995

[51] Int. Cl.⁶ .................................................. B65G 25/00
[52] U.S. Cl. ...................................... 198/774.1; 198/774.3
[58] Field of Search ............................ 198/468.6, 774.1, 198/774.3; 414/750

[56] References Cited

U.S. PATENT DOCUMENTS

| | | | |
|---|---|---|---|
| 3,187,883 | 6/1965 | Umbricht | 198/774.1 |
| 3,970,191 | 7/1976 | Oldfield et al. | 198/774.1 |
| 4,151,907 | 5/1979 | Doty | 198/774.1 |
| 4,254,861 | 3/1981 | Schuricht | 198/774.3 |
| 5,449,062 | 9/1995 | McTaggart | 198/774.1 |
| 5,524,748 | 6/1996 | McTaggart | 198/774.1 |

*Primary Examiner*—Joseph E. Valenza
*Attorney, Agent, or Firm*—Gifford, Krass, Groh, Sprinkle, Patmore, Anderson & Citkowski, P.C.

[57] ABSTRACT

A lift and carry accumulating conveyor is disclosed having a frame and a pair of elongated stationary rails attached to the frame such that the stationary rails are spaced apart and parallel to each other. A transfer rail assembly having a pair of elongated transfer rails is positioned in between the stationary rails and are movable relative to the stationary rails between both a raised and a lower position as well as between a forward and a retracted position. A pair of longitudinally spaced drive arm assemblies are pivotally disposed between the frame and a lower end of the transfer rail assembly. The upper end of each drive arm assembly abuts against the lower end of the transfer rail assembly so that, as the driver arm assembly is pivoted between a lower and an upper position, the drive arm assemblies simultaneously move the transfer rail assembly between its lower and raised positions. A single elongated link extends between the drive arm assemblies which ensures that the drive arm assemblies move in unison with each other.

6 Claims, 2 Drawing Sheets

ACCUMULATING LIFT AND CARRY CONVEYER SYSTEM

BACKGROUND OF THE INVENTION

Field of the Invention

There are many previously known accumulating lift and carry conveyor systems for transferring parts, such as piston connecting rods, in a manufacturing environment. These previously known accumulating conveyor systems typically comprise a pair of elongated stationary rails which are spaced apart and parallel to each other. These stationary rails are spaced apart from each other by a distance such that the stationary rails can support opposite sides of the conveyed items.

A transfer rail assembly is disposed in between the stationary rails. The transfer rail assembly includes a pair of elongated transfer rails which are spaced apart and parallel to each other. Unlike the stationary rails, the transfer rails are movable between a raised and lower position, as well as also between a forward and a retracted position. In their raised position, the transfer rails engage and lift the conveyed parts up above the stationary rails. Thereafter, the transfer rails are moved to their forward position, simultaneously moving the conveyed parts forwardly along the conveyor system. Thereafter, the transfer rails are moved to their lower position again re-depositing the conveyed parts on the stationary rails. The transfer rails are then moved to their retracted position, and the above cycle is repeated.

In order to move the transfer rail assembly between its raised and lower position, typically a pair of drive arm assemblies are disposed between the conveyor frame and the transfer rail assembly. One end of each drive arm assembly is pivotally connected to the frame while its upper end abuts against the bottom of the transfer rail assembly. Consequently, as the drive arm assemblies pivot from a first to a second position, the drive arm assemblies simultaneously vertically displace the transfer rail assembly from its lower position to its raised position.

In order to move the transfer rail assembly between its forward and retracted position, typically a drive plate is connected to the bottom of the transfer rail assembly along its center line. This drive plate is then longitudinally displaced between the forward and the retracted position by a motor, typically employing an eccentric cam.

In order to ensure that the transfer remain horizontal during their vertical displacement and thus preventing any cocking of the transfer rails, the drive arm assemblies are typically connected together by a pair of elongated link arms such that one link arm extends along each side of the drive plate. Furthermore, it has been previously necessary to utilize a pair of link arms in order to prevent excessive torsional loads on the drive arm assemblies that might otherwise be caused if a single off-center link arm were used.

While these previously known conveyor systems have operated satisfactorily, the necessity to provide two elongated link arms is relatively expensive, thus increasing the overall cost of a conveyor system. Furthermore, since the motor which drives the drive arms between their first and second pivotal positions must also both longitudinally and vertically displace the link arms, the use of two link arms between each adjacent pair of drive arm assemblies necessarily increases the motor power requirements for the conveyor system and also the overall cost of the conveyor system.

SUMMARY OF THE PRESENT INVENTION

The present invention provides an accumulating lift and carry conveyor system which overcomes all of the above-mentioned disadvantages of the previously known devices.

In brief, the accumulating lift and carry conveyor system of the present invention comprises a frame having a pair of elongated stationary rails secured to the frame such that the rails are spaced apart and parallel to each other. The stationary rails are spaced from each other such that the stationary rails engage and support opposite sides of the parts, such as piston connecting rods, which are conveyed.

A transfer rail assembly is also mounted to the frame in between the stationary rails. The transfer rail assembly includes a pair of elongated transfer rails which are spaced apart and parallel to each other. Unlike the stationary rails, however, the transfer rails are movable both between a lower and a raised position as well as between a retracted and a forward position.

In operation, with the transfer rail assembly in its lower and retracted position, the transfer rails are first moved to their raised position whereupon the transfer rails engage and lift the conveyed parts from the stationary rails. The transfer rails are then moved to their forward position thus conveying the parts forwardly. The transfer rails are then moved to their lower position thus re-depositing the conveyed parts on the stationary rails. Finally, the transfer rails are moved to their retracted position, and the above process is repeated.

In order to move the transfer rail assembly between its lower and raised position, the conveyor system includes a pair of drive arm assemblies. Each drive arm assembly includes a lower end which is pivotally mounted to the frame such that the drive arm assemblies are positioned between the transfer rail assembly and are longitudinally spaced from each other. The upper end of the drive arms abuttingly engage and support the bottom of the transfer rail assembly. Thus, as the drive arm assemblies pivot between a first and second position, the transfer rail assembly is simultaneously moved from its lower to its raised position.

Unlike the previously known accumulating conveyor systems, however, in order to synchronize the pivotal action of the drive arm assemblies, a single elongated link is pivotally connected at each end to the drive arm assemblies. Furthermore, the single link extends along the central line of the transfer rail assembly such that torsional forces on the drive arm assemblies are completely eliminated.

In order to drive the transfer rail assembly between its forward and retracted position, a vertically extending drive plate is secured to the bottom of the transfer rail assembly along one side of the connecting link. This drive plate is driven between a forward and a retracted position by a motor having a concentric cam connected to it which co-acts with a channel in the drive plate.

By utilizing a single link extending between the drive arm assemblies, the present invention eliminates both the expense and weight of using a dual link system as in the previously known conveyor systems.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figures 1, 2:
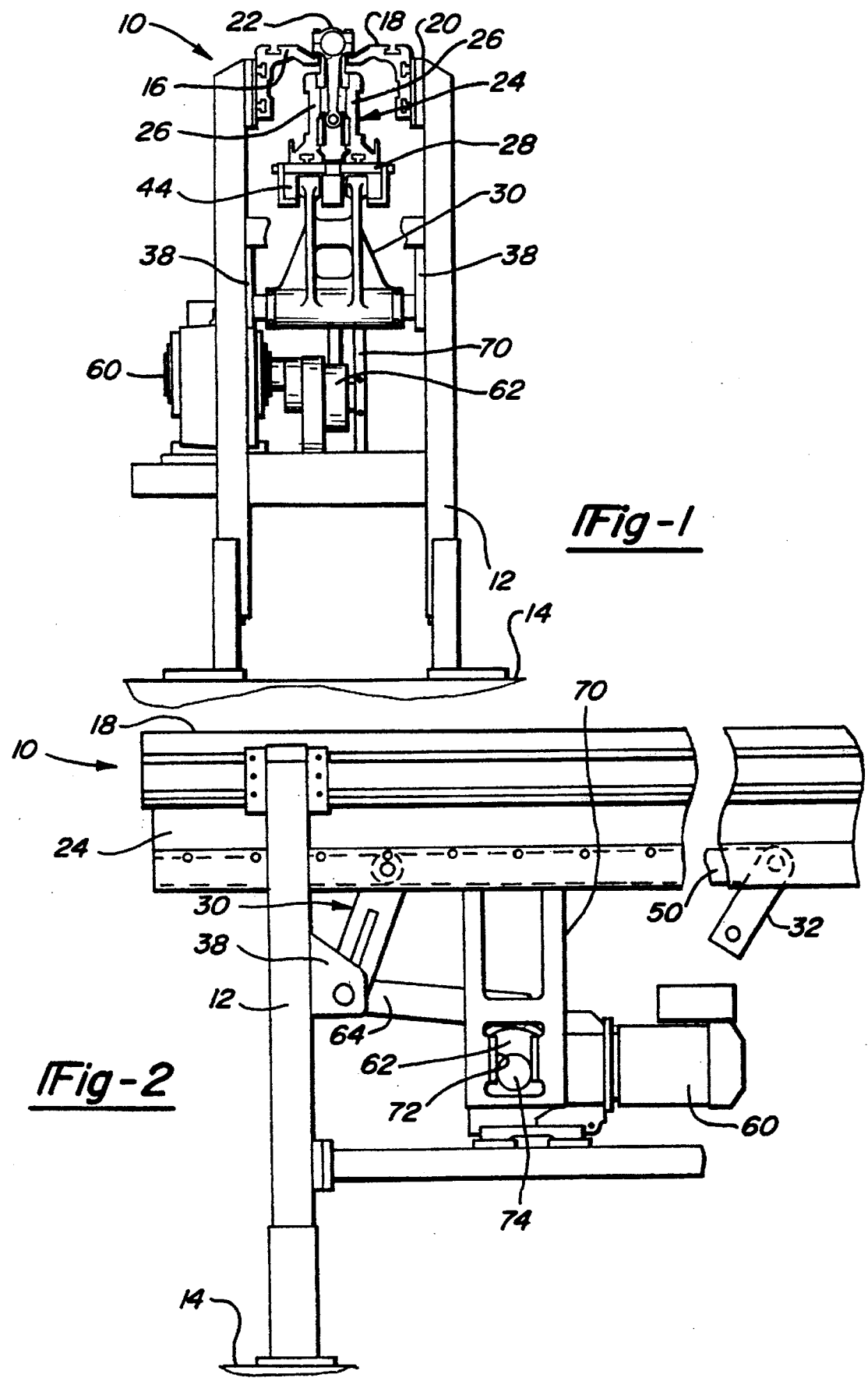
FIG. 1 is an end view illustrating a preferred embodiment of the present invention.
FIG. 2 is a fragmentary side view illustrating a preferred embodiment of the present invention.

With reference first to FIGS. 1 and 2, a preferred embodiment of the accumulating conveyor system 10 of the present invention is there shown and comprises a frame 12 supported by a ground support surface 14. A pair of elongated stationary rails 16 and 18 are secured to the frame 12 adjacent its upper end 20.

The stationary rails 18 are spaced apart and parallel to each other. Furthermore, as there shown in FIG. 1, the stationary rails 16 and 18 are spaced apart from each other by a distance such that the rails 16 and 18 engage and support opposite sides of a conveyed part 22, such as a piston connecting rod.

Still referring to FIGS. 1 and 2, the conveyor system 10 includes a transfer rail assembly 24 which is positioned beneath and in between the stationary rails 16 and 18. The transfer rail assembly 24 includes a pair of transfer rails 26 which are mounted at their lower ends to a carriage plate 28. The upper ends of the transfer rails 26 are positioned in between the stationary rails 16 and 18 and are adapted to engage opposite sides of the conveyed part 22.

In the conventional fashion, the carriage assembly 24 is movable both between a raised and a lower position as well as a forward and a retracted position. In its raised position, the transfer rails 26 lift the conveyed parts 22 up from the stationary rails 16 and 18. Conversely, with the transfer rails 26 in their lower position, the conveyed parts 22 are supported by the stationary rails 16 and 18.

In the conventional fashion, in operation, the transfer assembly 24, while in its retracted position, is moved to its raised position, thus lifting the conveyed parts 22 up from the stationary rails 16 and 18. The transfer rail assembly 24 is then moved to its forward position thus advancing the conveyed parts 22 along the conveyor line.

Thereafter, the transfer rail assembly 24 is moved to its lower position again re-depositing the conveyed parts 22 on the stationary rails 16 and 18. Then, with the transfer rail assembly 24 in its lower position, the transfer rail assembly 24 is moved to its retracted position whereupon the above process is repeated.

Still referring to FIGS. 1 and 2, a pair of longitudinally spaced drive assemblies 30 and 32 (FIG. 2) are provided for moving the transfer rail assembly 24 between its lower and raised position. The drive arm assemblies 30 and 32 are substantially identical to each other so that only the drive arm assembly 30 will be described in detail, it being understood that a like description shall also apply to the other drive arm assembly 32. Preferably, the drive arm assemblies 30 are aluminum castings which reduce fabrication time.

Figure 3:
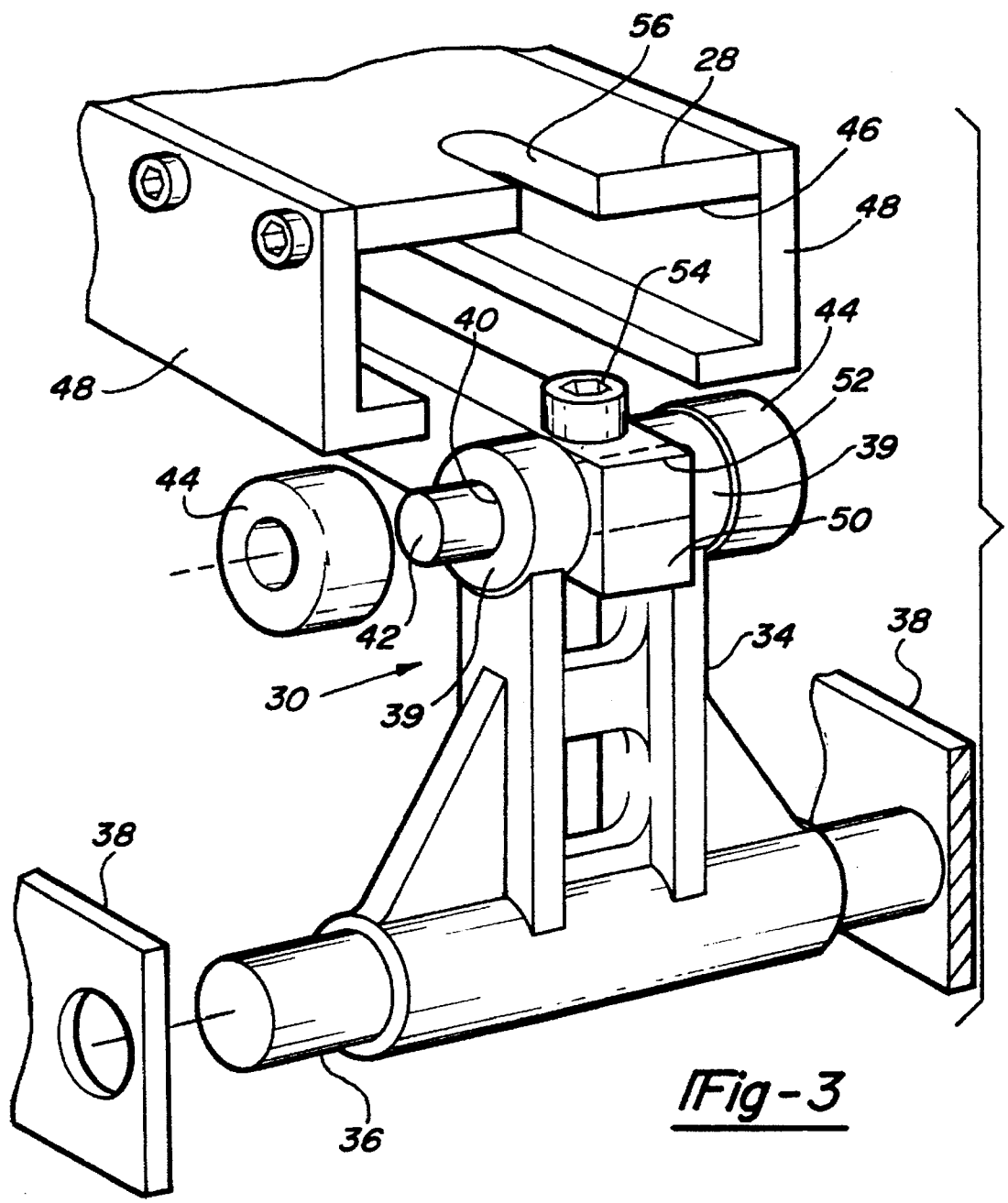
FIG. 3 is an exploded respective view illustrating a portion of the preferred embodiment of the present invention.

With reference now to FIG. 3, the drive arm assembly 30 is there shown in greater detail and comprises an elongated body 34 having a transverse shaft 36 secured across its lower end. This transverse shaft 36 is pivotally mounted between a pair of axle supports 38 which, in turn, are secured to the frame 12. Any conventional bearings can be used between the shaft 36 and supports 38.

A pair of generally circular and laterally spaced bosses 39 are formed at the upper end of the body 34 opposite from the axle 36. The bosses 39 include registering bores 40 through which an axle 42 is disposed. A portion of the axle 42 extends outwardly from each boss 39 to form a pair of stub axles which face in opposite lateral directions from each other.

With reference now to FIGS. 1 and 3, a roller 44 is mounted to each end of the axle 42 and these rollers abut against and support a bottom surface 46 of the carriage plate 28 (see FIG. 1).

In order to eliminate lateral movement of the transfer rail assembly 24 relative to the drive arm assembly 30, a pair of L-shaped plates 48 are secured to opposite sides of the carriage plate 28. These L-shaped plates 48, together with the carriage plate 28, are disposed around the top, bottom and free end of the rollers 44 thus preventing lateral displacement of the transfer rail assembly 24.

With reference now to FIGS. 2 and 3, it is necessary that the drive arm assemblies 30 and 32 pivot in use and with each other. In order to accomplish this, a single elongated link 50 extends between the drive arm assemblies 30 and 32 so that each end of the link 50 is positioned in between the circular bosses 39 of the drive arm body 34. Furthermore, each end of the link 50 includes a transverse bore 52 through which the shaft 42 extends. Consequently, the link 50 is not only pivotally mounted to the upper end of the drive arm body 34, but also extends along the central line of the transfer rail assembly 24. This provision thus completely eliminates torsional forces which may otherwise be imposed on the drive arm body 34.

As best shown in FIG. 3, a guide pin 54 is preferably fastened to each end of the link 54. The guide pin 54 is received within a slot 56 or in the carriage the carriage plate 28 to further prevent lateral movement of the transfer rail assembly 24 relative to the drive arm assemblies 30 and 32.

With reference now particularly to FIG. 2, a motor 60 drives an output cam 62 through its output shaft. The output cam 62 cooperates with a lever 64 secured to the drive arm 30 so that rotation of the motor output shaft pivots the end drive arm 30 between the first and second pivotal positions. Since the second drive arm assembly 32 is coupled to the drive arm assembly 30 by the link 50, the drive arm assemblies 30 and 32 pivot in unison with each other.

The pivotal action of the drive arm assemblies 30 and 32 vertically displace the transfer rail assemblies 24 between the raised and lower position due to the coaction between the rollers 44 and the bottom 46 of the carriage plate 28. Furthermore, since the rollers 44 are positioned on opposite sides of the elongated link 50, the forces are evenly distributed between the rollers 44 thus eliminating, or at least minimizing, torsional forces on the drive arm body 34.

As best shown in FIGS. 1 and 2, a vertically extending drive plate 70 has its upper end secured to the carriage plate 28. The lower end of the drive plate 70 includes a vertically extending channel 72 (FIG. 2) which coacts with the cam 74 driven by the motor 60 to produce reciprocal movement of the transfer rail assembly 24 between its forward and its retracted position. This reciprocal longitudinal displacement of the transfer rail assembly 24 is synchronized with the vertical displacement of the transfer rail assembly 24 via the drive arm assembly 30 and 32 to produce the accumulating conveying action previously described.

The accumulating conveyor system of the present invention achieves many advantages over the previously known systems. Most importantly, the provision of a single link connecting the drive arm assemblies 30 and 32 reduce not only the cost of the previously known dual link arms, but also reduces the power consumption requirements for the motor. Furthermore, this is all achieved without introducing torsional forces on the drive arm assemblies 30 and 32.

Having described my invention, it can be seen that the present invention provides a simple and yet highly effective accumulating conveyor system. Having described my invention, however, many modifications thereto will become apparent to those skilled in the art to which it pertains without deviation from the spirit of the invention as defined by the scope of the appended claims.

I claim:

1. A lift and carry accumulating conveyor comprising a frame, a pair of elongated stationary rails attached to said frame so that said stationary rails are spaced apart and parallel to each other, a transfer rail assembly having a pair of elongated transfer rails, said transfer rails being positioned between said stationary rails and movable relative to said stationary rails between a raised and a lower position and also between a forward and a retracted position, means for moving said transfer rail assembly between said upper and lower position comprising a pair of longitudinally spaced drive arm assemblies, a first end of each drive arm assembly being pivotally mounted to said frame and a second end of said drive arm assembly abuttingly engaging a bottom of said transfer rail assembly, an elongated link extending between said drive arm assemblies so that said drive arm assemblies pivot in unison with each other, said link being substantially aligned with a center line of said transfer rail assembly, wherein pivotal movement of said drive arm assemblies between a first and second pivotal position moves said transfer rail assembly between said raised and said lower position wherein said transfer rail assembly comprises a carriage plate secured to and extending across a bottom of said transfer rails, and wherein said second end of said drive arm assembly abuttingly engages a bottom of said carriage plate, wherein said drive arm assembly comprises an elongated drive arm and a pair of rollers rotatably mounted to one end of said drive arm, said rollers engaging said bottom of said carriage plate, and an L-shaped channel secured to each side of said carriage plate, said rollers being positioned between said L-shaped plates and a portion of each L-shaped plate being positioned beneath its associated roller.

2. The invention as defined in claim 1 wherein said link is positioned between said rollers.

3. The invention as defined in claim 1 and comprising means for pivotally driving said drive arm assembly between said first and second pivotal positions, said driving means comprising a motor having an output shaft, a cam secured to said output shaft, an elongated lever having one end secured to said drive arm assembly and its other end operatively connected with said cam.

4. The invention as defined in claim 3 and comprising a roller secured to said other end of said lever which engages a surface on said cam.

5. The invention as defined in claim 3 and comprising means driven by said motor for moving said transfer rail assembly between said forward and said retracted position.

6. The invention as defined in claim 5 wherein said means for moving said transfer rail assembly between said forward and said retracted position comprises a drive plate having an upper end secured to said transfer rail assembly, a second cam secured to said output shaft of said motor, said second cam being positioned in a slot formed in said drive plate.

* * * * *